July 23, 1935. P. F. ROSSMANN 2,008,967
CLUTCH STRUCTURE
Filed March 9, 1934
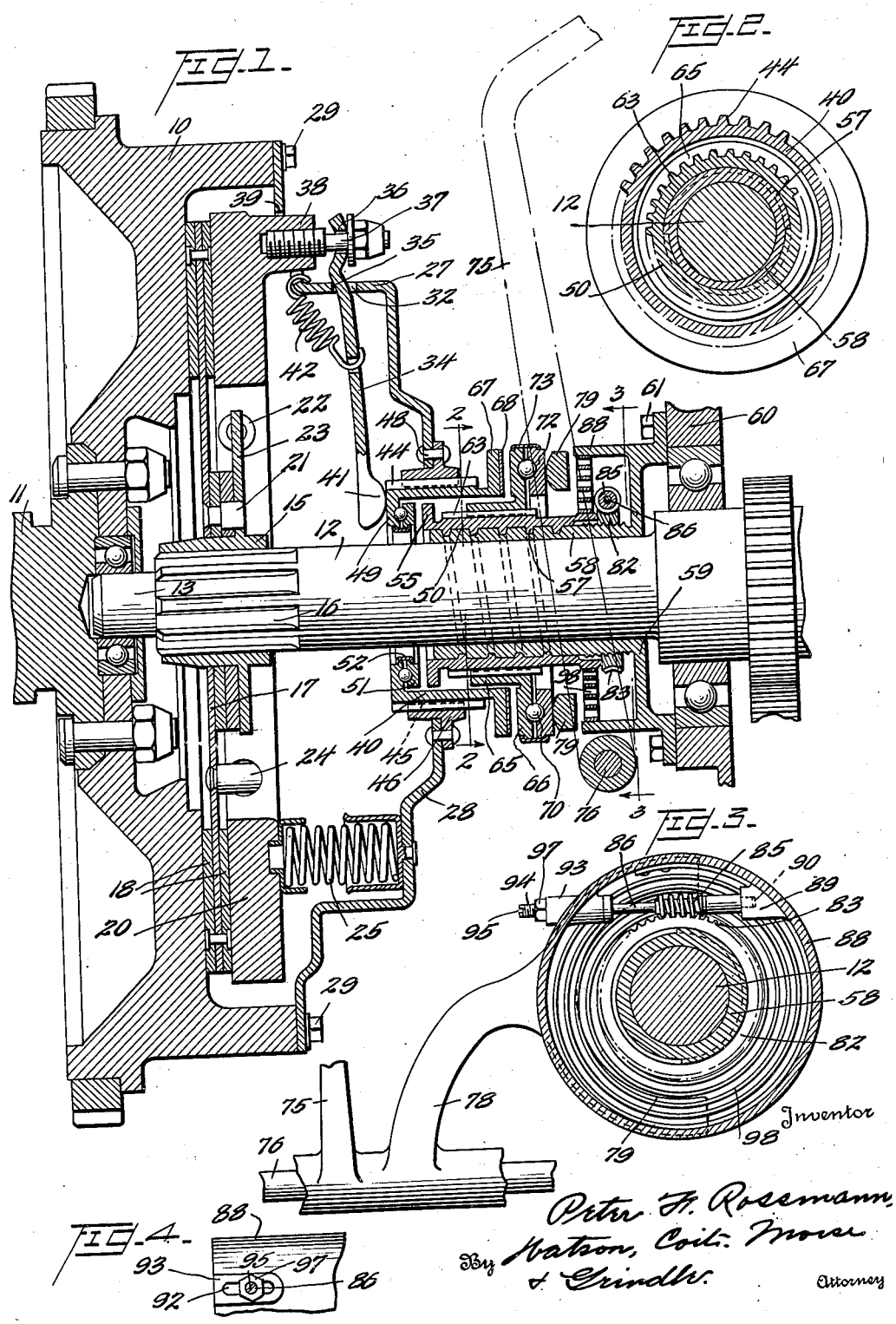

Patented July 23, 1935

2,008,967

UNITED STATES PATENT OFFICE 2,008,967

CLUTCH STRUCTURE

Peter F. Rossmann, Detroit, Mich., assignor, by mesne assignments, to Robert C. Russell, Detroit, Mich.

Application March 9, 1934, Serial No. 714,870

21 Claims. (Cl. 192—35)

This invention relates to improvements in mechanism for controlling the operation of motor vehicles and in particular to control mechanism for the vehicle clutch.

It is the principal object of the invention to provide clutch operating mechanism which is inexpensive and simple to construct and repair and which will reduce to a minimum the effort required for clutch control. Thus it is a feature of the invention that energy derived from the vehicle motor is applied to the clutch actuating mechanism to facilitate manipulation thereof. It is a more specific object of the invention to provide a manually operable clutch releasing mechanism comprising a mechanical connection between the clutch and the usual clutch pedal, and means in the nature of a servo-motor whereby, when the motor is in operation, a portion of the torque delivered by the motor is applied to the operating mechanism, the force required for depression of the clutch pedal being sufficient only to control the application of power to the clutch operating mechanism. The invention may be readily applied to the control of a conventional clutch and is of such nature as to necessitate little change in existing clutch and clutch operating structures.

In the preferred form of the invention the clutch is released by axial displacement of a sleeve surrounding the driven shaft, a member equivalent to the usual clutch throw-out bearing being axially displaceable to engage and displace the sleeve to release the clutch when the motor is not functioning. When the motor is in operation, the engagement of this member and the sleeve serves to energize the servo-motor from the vehicle motor, the servo-motor then operating to effect axial displacement of the member toward clutch releasing position as long as such engagement is maintained.

It is a further object of the invention to provide clutch operating mechanism of this character in which adequate clearance in the operating mechanism is provided to ensure complete engagement of the clutch, this clearance being readily adjustable.

Further objects and features of the invention will be apparent from the following description taken in connection with the accompanying drawing, in which Figure 1 is a longitudinal sectional view of a clutch showing the application of the invention to the operating mechanism therefor;

Figure 2 is a transverse sectional view taken substantially on the line 2—2 of Figure 1;

Figure 3 is a transverse sectional view taken substantially on the line 3—3 of Figure 1; and Figure 4 is a fragmentary side elevation of a portion of the structure shown in Figure 3.

In the specification and in the accompanying drawing a specific embodiment of the invention is disclosed and this embodiment is described in detail. It will nevertheless be understood that the primary purpose of illustrating the invention by reference to a specific form thereof and by the employment of detailed language herein is to facilitate an understanding of the principles underlying the invention, and that the scope of the invention is not intended to be limited thereby.

Figure 1 discloses a flywheel 10 secured to the motor shaft 11 in the usual manner, and a driven shaft 12 journalled as shown at 13 in the flywheel and arranged to be coupled with and uncoupled therefrom by a clutch. The clutch may comprise the usual hub member 15 supported on the driven shaft 12 for rotation therewith and for axial movement with respect thereto by the splined connection 16. A clutch driven disc 17 is mounted on the hub 15 and is provided with clutch facings or friction annuli 18 secured thereto in a conventional manner. The driven disc 17 is arranged between the rear race of the flywheel 10 and the clutch or pressure plate 20 which, as hereinafter will be more fully explained, is adapted to be operated to either clamp the driven disc 17 for equal rotation with the flywheel 10 or to free it of engagement therewith. The driven disc 17 is connected to the hub 15 for limited rotational movement with respect thereto by means of pins 21 and the hub 15 is provided with a plurality of radially extending circumferentially spaced projections or flanges 23 arranged in axially spaced relation with respect to the driven disc 17. The driven disc 17 is provided with an equal number of rearwardly projecting pins 24 equally angularly spaced with respect to each other and extending into intersecting relation with respect to the plane of the flanges 23. Coil springs 22 are held under compression between corresponding pins 24 and flanges 23 so as to yieldably resist relative rotational movement between the hub 15 and disc 17 within the limits of movement controlled by the pins 21, this yielding connection between the clutch disc 17 and its hub 15 being of a conventional nature and permitting the clutch to engage smoothly.

The clutch plate 20 is normally urged toward the flywheel 10 to clamp the disk 17 therebetween and thereby engage the clutch by means of coil springs 25 compressed between the plate 20 and the rear wall of a clutch cover plate 28, the latter being secured adjacent the periphery thereof to the flywheel 10 as indicated at 29. The disk 17 and clutch plate 20 thus constitute the movable elements of the clutch.

The axially extending portion 27 of the cover plate is apertured as indicated at 32 at one or more circumferentially spaced points to permit the passage therethrough of one or more clutch fingers or levers 34, each clutch finger being fulcrumed as at 35 on the wall defining the forward edge of the associated opening 32 and being recessed as at 36 adjacent the outer end thereof to receive a bolt 37 threaded into a boss 38 formed on the clutch plate 20 and extending rearwardly through an opening 39 in the clutch cover plate, the fingers being thus retained against circumferential displacement with respect to the clutch plate 20. A coil spring 42, acting between each clutch finger and the clutch cover plate 28 as shown in Figure 1 serves to retain the associated clutch finger in engagement with the fulcrum 35 therefor and with the head of the associated bolt 37.

The inner end of each clutch finger 34 may be enlarged as indicated at 41 for engagement by an axially displaceable element 40 in the form of a sleeve surrounding the driven shaft 12. The sleeve 40 is rotatable with and axially movable with respect to the flywheel 10 and for this purpose is provided on its periphery with an externally toothed portion 44 having a sliding fit with a correspondingly internally toothed portion 45 formed on an annular member 46, the latter being secured to the clutch cover plate 28 as indicated at 48. The inwardly directed flange portion 49 of the sleeve 40 which engages with the clutch fingers is formed to provide one race of an anti-friction bearing, the cooperating race 51 being retained in position by means of a clip 52. A sleeve 50 surrounding the driven shaft 12 is provided with an annular flange portion 55 adjacent the forward end thereof for engagement with the bearing race 51 on the sleeve 40 when the sleeve 50 is displaced axially of the shaft, a small axial clearance being provided between the sleeves 40 and 50 when the clutch is engaged as shown in Figure 1. The sleeve 50 is provided with a threaded connection as indicated at 57 to a sleeve 58 likewise surrounding the shaft, the sleeve 58 being preferably formed as a forwardly directed integral extension of the member 59 which is secured to the forward wall 60 of the transmission housing as indicated at 61. In this or any other suitable manner the sleeve 58 is retained against either axial or rotary displacement.

It may be here observed that the sleeves 50 and 58 constitute in effect an axial cam device of which the rotatable portion or follower comprises the sleeve 50, the threads constituting the cooperating cam surfaces being left-hand so that when the sleeve 50 is rotated in a clockwise direction as viewed from the front of the vehicle or as seen in Figure 2 of the drawing, the flange 55 of the sleeve 50 will be moved into engagement with the anti-friction bearing carried by the sleeve 40 and on continued rotation will displace the latter forwardly or to the left as viewed in Figure 1 to effect release of the clutch in a manner hereinbefore explained.

The sleeve 50 is further provided with an externally toothed or splined connection 63 with a member 65, the latter being in the form of a sleeve having an annular flange portion 66 positioned opposite to and normally spaced from an annular flange portion 67 formed on the rearward end of the sleeve 40. One of these flange portions, for instance the flange 67, is provided with an annular friction facing 68 of suitable character. The flange portion 66 of the member 65 is further provided with an anti-friction bearing 70 comprising a race formed in the flange 66 and a cooperating race member 72, the latter being retained in position by means of a bearing clip 73. The member 65 is manually displaceable axially of the sleeve 50 but is constrained for rotation therewith by the toothed connection 63. Thus the usual clutch pedal 75 fulcrumed on a shaft 76 extending transversely of and supported in any convenient manner in the clutch housing (not shown) may be provided with an arm 78 rigid therewith and having a yoke portion 79 partially embracing the shaft and positioned for engagement with the bearing race 72 carried by the member 65. It will be understood that the term "manual operation" includes either foot or hand manipulation and that the precise construction of the clutch pedal and associated parts is not an essential feature of the invention, it being only necessary that some means be provided for displacing the member 65 axially of the shaft 12, the member 65 corresponding generally to the usual clutch throw-out bearing.

The sleeve 58 is provided adjacent its rearward end with an abutment to limit rearward movement of the sleeve 50 thereon. Preferably this abutment is adjustable axially of the shaft 12 and may comprise a nut element 82 threaded on the sleeve and provided adjacent its periphery with a worm gear toothed portion 83 which is engaged by a worm 85, the latter being carried by or formed on a shaft 86. In the broader aspects of the invention the shaft 86 may extend through the usual clutch housing (not shown) so as to be readily accessible from the exterior of the same, but ordinarily it will be found satisfactory if it is supported as shown in the drawing wherein it terminates within such clutch housing in which case it is accessible through the usual inspection plate in the latter. Thus the member 59 may be provided with a forwardly directed annular portion 88 having an inwardly directed boss 89 formed thereon to provide a seat 90 for one end of the shaft 86, the seat 90 comprising an axially extending slot permitting limited axial movement of the shaft 86. The opposite end of the shaft 86 extends through a corresponding slot 92 provided in a boss 93 formed on the annular portion 88 of the member 59, the shaft 86 being threaded as indicated at 94 and having a slotted end 95, a lock nut 97 cooperating with the threaded portion 94 of the shaft 86 to retain the latter in any position to which it may be rotated.

Thus on rotation of the shaft 86, the nut element 82 and the shaft 86 are displaced on the sleeve 58 and the axial clearance between the sleeves 40 and 50 in the engaged position of the clutch may be thereby adjusted.

Means are provided to normally retain the sleeve 50 in its rearward position in engagement with the abutment 82. This means may consist, for instance, of a spirally arranged spring 98 connected at its opposite ends to the annular portion 88 of the member 59 and to the sleeve 50, the spring 98 being torsionally stressed to a sufficient extent to effect rotation in a counterclockwise direction as shown in Figure 2 of the sleeve 75

50 so as to retain the latter in the position which it occupies in Figure 1.

The operation of the device thus far described will now be obvious. Assuming that the vehicle motor is in operation and that it is desired to release the clutch, the pedal 75 is depressed to displace the manually operable member 65 forwardly, the latter sliding on the sleeve 50 which is retained against rotation by the spring 98 and in the position shown in Figure 1 of the drawing. When the flange portion 66 of the member 65 engages the flange portion 67 of the sleeve 40 through the medium of the friction facing 68, the member 65 will be caused to rotate by reason of this frictional connection in a clockwise direction as viewed from the left in Fig. 1, it being observed that the sleeve 40 is continually rotated during operation of the motor. This rotation of the member 65 is transmitted to the sleeve 50 through the splined connection 63 and the sleeve 50 thus moves forwardly to engage the flange 55 with the bearing race 51 of the sleeve 40. Continued rotation of the sleeve 50 displaces the sleeve 40 in a forward direction or to the left as shown in Figure 1 and the clutch fingers 34 are rocked about the fulcrums 35 therefor to release the clutch. In order that the rotation of the sleeve 50 may be continued to an extent sufficient to effect complete disengagement of the clutch, it is necessary to maintain frictional engagement between the member 65 and the sleeve 40. Thus it is necessary not only to initially contact the flanges 66 and 67 but to maintain this frictional engagement by progressive depression of the clutch pedal 75 in the usual manner, the construction thus functioning as a follow-up mechanism with the sleeve 40 advancing against the action of the springs 25 by reason of the power supplied thereto by the motor. In order to maintain the clutch disengaged, the flanges 66 and 67 must be retained in frictional contact, the engagement thereof being relatively light by reason of the fact that this contact tends to further advance the sleeve 40 and thus withdraw the flange 67 from the flange 66.

As soon as the clutch pedal 75 is released, the manually operable member 65 is permitted to move rearwardly and the frictional engagement between the flanges 66 and 67 is thus interrupted. The tendency to rotate the sleeve 50 in a clockwise direction and to thereby retain the latter in its forward position is thus interrupted and the spring 98 rotates the sleeve 50 in a counterclockwise direction to return the latter to the position shown in Figure 1, the sleeve 40 being likewise displaced rearwardly under the action of the springs 25 which engage the clutch.

It is frequently necessary to release the clutch while the vehicle motor is not in operation. It will be observed that the mechanism thus far described functions in a normal manner to effect this release, the depression of the pedal 75 acting to displace the member 65 and the sleeve 40 axially of the shaft in a forward direction to operate the clutch fingers 34. Thus when the motor is inoperative a direct mechanical connection is afforded between the clutch pedal and the clutch, this mechanical connection including the friction coupling which is employed during operation of the motor to effect power disengagement of the clutch.

While the invention is of primary importance in the application thereof to clutch control mechanism, it will be appreciated that the principles of the invention may be applied to brake mechanism, the energy for the servo-device being derived either from the vehicle motor in the manner illustrated herein or from the individual road wheels. Application of the invention to other types of control mechanism can also be readily effected by those skilled in the art to which the invention relates.

Having thus described the invention, what is claimed as new and desired to be secured by Letters Patent is:

1. In a motor vehicle, the combination with a vehicle driving motor, of a clutch associated with said motor for interrupting or establishing the drive from the latter, and mechanism for controlling the operation of said clutch, said mechanism including a rotatable cam device, connections between said cam device and clutch for controlling the operation of the latter when said cam device is rotated, means including a friction coupling for selectively connecting said motor and said cam device to effect rotation of the latter, a manual control device for engaging said coupling, and a mechanical connection between said manual control device and said clutch, whereby the latter may be manually controlled when said motor is inoperative.

2. In a motor vehicle, the combination with a vehicle driving motor, of a clutch associated with said motor for interrupting or establishing the drive from the latter, and mechanism for controlling the operation of said clutch, said mechanism comprising a servo-motor deriving power from said motor, manual control means for establishing an operative mechanical connection between said driving motor and said servo-motor to energize the latter, means connecting said servo-motor and said clutch to control the operation of the latter when said servo-motor is energized, and a direct connection between said manual operating means and said clutch to control the operation of the latter, whereby said clutch may be manually controlled when said driving motor is inoperative.

3. In a motor vehicle, the combination with a vehicle driving motor, of a clutch associated with said motor for interrupting or establishing the drive from the latter, and a follow-up mechanism deriving power from said driving motor for controlling the operation of said clutch, said mechanism including a manual operating means for frictionally coupling said driving motor and said follow-up mechanism to energize the latter by imparting rotational movement to a part thereof, and a mechanical connection between said manual operating means and said clutch, whereby the latter may be controlled when said driving motor is inoperative.

4. In a motor vehicle, the combination with a vehicle driving motor, of a clutch associated with said motor for interrupting or establishing the drive from the latter, and mechanism for controlling the operation of said clutch, said mechanism including a rotatable cam device, connections between said cam device and clutch for controlling the operation of the latter when said cam device is rotated, means including a friction coupling for selectively connecting said motor and said cam device to effect rotation of the latter, a manual control device for engaging said coupling, and a mechanical connection including said friction coupling, between said manual control device and said clutch, whereby the latter may be manually controlled when said motor is inoperative.

5. In a vehicle, the combination with the vehicle motor, of a driven shaft, clutch members for operatively connecting said motor and shaft, yielding means normally retaining said clutch members in engagement, an element axially displaceable against the action of said yielding means to release said clutch members, said element being connected for rotation with said motor, manually operable means movable axially to frictionally engage and to move said element to release said clutch, and a cam device rotatable with said manually operable means on frictional engagement of the latter with said element for displacing said element to clutch releasing position.

6. In a vehicle, the combination with the vehicle motor, of a driven shaft, clutch members for operatively connecting said motor and shaft, yielding means normally retaining said clutch members in engagement, an element axially displaceable against the action of said yielding means to release said clutch members, said element being connected for rotation with said motor, manually operable means movable axially to frictionally engage and to move said element to release said clutch, an axial cam member rotatable with and axially displaceable with respect to said manually operable means, and a fixed axial cam member, said cam members cooperating on rotation of said manually operable means by frictional engagement with said element to urge the latter to clutch releasing position.

7. In a vehicle, the combination with the vehicle motor, of a driven shaft, clutch members for operatively connecting said motor and shaft, yielding means normally retaining said clutch members in engagement, an element axially displaceable against the action of said yielding means to release said clutch members, said element being connected for rotation with said motor, manually operable means movable axially to frictionally engage and to move said element to release said clutch, a cam follower rotatable with said manually operable means and axially displaceable with respect thereto, and a fixed axial cam cooperating with said follower, said follower being movable axially by rotation thereof on frictional engagement of said manually operable means with said element to engage and move the latter to release the clutch.

8. In a vehicle, the combination with the vehicle motor, of a driven shaft, clutch members for operatively connecting said motor and shaft, yielding means normally retaining said clutch members in engagement, an element axially displaceable against the action of said yielding means to release said clutch members, said element being connected for rotation with said motor, manually operable means movable axially to frictionally engage and to move said element to release said clutch, a sleeve surrounding said shaft and retained against axial and rotative displacement, and a second sleeve having threaded engagement with said first sleeve and connected with said manually operable means for rotation therewith and axial displacement with respect thereto, the threaded engagement of said sleeves being of such hand that on frictional engagement of said element and manually operable means, said first sleeve is rotated to axially displace the same into engagement with said element to effect release of the clutch.

9. In a vehicle, the combination with the vehicle motor, of a driven shaft, clutch members for operatively connecting said motor and shaft, yielding means normally retaining said clutch members in engagement, an element axially displaceable against the action of said yielding means to release said clutch members, said element being connected for rotation with said motor, manually operable means movable axially to frictionally engage and to move said element to release said clutch, a cam device rotatable with said manually operable means on frictional engagement of the latter with said element for displacing said element to clutch releasing position, and yielding means urging said cam device in the opposite direction of rotation to a position affording axial clearance between said device and said element to permit engagement of said clutch members when frictional engagement between said manually operable means and said element is interrupted.

10. In a vehicle, the combination with the vehicle motor, of a driven shaft, clutch members for operatively connecting said motor and shaft, yielding means normally retaining said clutch members in engagement, an element axially displaceable against the action of said yielding means to release said clutch members, said element being connected for rotation with said motor, manually operable means movable axially to frictionally engage and to move said element to release said clutch, a cam device rotatable with said manually operable means on frictional engagement of the latter with said element for displacing said element to clutch releasing position, yielding means urging said cam device in the opposite direction of rotation to a position affording axial clearance between said device and said element to permit engagement of said clutch members when frictional engagement between said manually operable means and said element is interrupted, and an abutment adjustable axially and cooperating with said cam device for regulating such axial clearance.

11. In apparatus of the class described, the combination with a rotating, axially displaceable member, of means movable axially into frictional engagement with said member to displace the latter, a fixed cam, and a cam follower cooperating with said cam and rotating with and axially movable with respect to said means, said cam follower being positioned to engage and axially displace said member when rotated by frictional engagement of said means and said member.

12. In combination, a clutch including a driving member and a driven member and means constantly urging said members toward engaged relation with each other, a transmission housing in spaced relation with said clutch, and means interposed between said clutch and transmission housing for controlling the operation of said clutch including a support fixed to said transmission housing, an element rotatable with and axially movable with respect to said driving member and so constructed and arranged as to cooperate with said means to effect disengagement of said clutch when moved to one limit of its axially movable position, a normally stationary element rotatably mounted on said support so constructed and arranged as to move axially upon said support upon rotation relative thereto, and means for frictionally connecting said elements whereby to effect rotational movement and consequent axial advancement of the second mentioned element and corresponding axial advancement of both said elements toward clutch disengaged position.

13. In combination, a clutch including a driving member and a driven member and means constantly urging said members toward engaged relation with each other, a transmission housing in spaced relation with said clutch, and means interposed between said clutch and transmission housing for controlling the operation of said clutch including a support fixed to said transmission housing, an element rotatable with and axially movable with respect to said driving member and so constructed and arranged as to cooperate with said means to effect disengagement of said clutch when moved to one limit of its axially movable position, a normally stationary element rotatably mounted on said support so constructed and arranged as to move axially upon said support upon rotation relative thereto, means for frictionally connecting said elements whereby to effect rotational movement and consequent axial advancement of the second mentioned element and corresponding axial advancement of both said elements toward clutch disengaged position, and manually controllable means arranged in follow up relation with respect to the axial movement of said second mentioned element for controlling the frictional connection between said elements.

14. In combination, a clutch including a driving member, a driven member, a pressure plate normally clamping said driven member to said driving member for equal rotation therewith, clutch fingers operable to withdraw the pressure plate from clamping relation with respect to said driving member, a transmission housing in spaced relation with respect to said clutch, means interposed between said transmission housing and said clutch operable to effect disengagement of said clutch including a support fixed with respect to said transmission housing, an element rotatable with and axially movable with respect to said clutch and cooperable with said fingers, a second element mounted upon said support and so constructed and arranged with respect thereto that rotational movement thereof on said support will effect axial advancement thereof, said elements being so constructed and arranged that axial movement of said second element will effect axial movement of the first mentioned element whereby to cause the first mentioned element to move said fingers toward clutch disengaged position, and manually controllable means for frictionally connecting said elements together whereby to cause the second mentioned element to be rotated by the first mentioned element.

15. In a clutch structure, in combination, a driving member, a driven member, a pressure plate normally urged toward a position to clamp said driven member to said driving member for equal rotation therewith, means movable to withdraw said pressure plate from clamping relation with respect to said driven member, an element connected to said driving member for equal rotation therewith and movable axially thereof and cooperating with said means to move said pressure plate toward clutch disengaged position, a support mounted independently of said clutch, a second element mounted on said support so constructed and arranged with respect thereto that rotational movement thereof on said support effects axial advancement thereof with respect to said support, said second element being arranged to effect axial movement of the first mentioned element upon axial movement of said second element in one direction, and means for frictionally connecting said members together to effect rotational movement of said second mentioned element.

16. In combination, a rotatable driving member, an element carried thereby in concentric relation therewith and mounted for equal rotation and axial movement with respect thereto, a support arranged in approximately concentric relation with respect to said driving member and element, an element mounted on said support for rotational and axial movement with respect thereto and being so constructed and arranged that relative rotation thereof on said support causes axial advancement thereof relative to said support, the second mentioned element cooperating with the first mentioned element whereby when said second mentioned element is moved axially in one direction it causes a corresponding axial movement of said first mentioned element, a third element secured for equal rotation with and axially slidable movement with respect to said second mentioned element, and means for frictionally urging said third element to rotate with said first mentioned element whereby to effect rotation of said second mentioned element on said support and consequent axial displacement of said first mentioned element.

17. In a clutch structure, in combination, a clutch driving member, a clutch cover fixed to said driving member, a driven member and a pressure plate within said clutch cover, means constantly urging said pressure plate to clamp said driven member to said driving member, fingers cooperating with said pressure plate and movable to release said pressure plate from clamping relation with respect to said driven member, an element centrally supported by said cover plate and arranged for equal rotation and axially slidable movement with respect thereto, a stationary support, a second element carried by said support and so constructed and arranged that relative rotation thereof on said support effects axial advancement thereof with respect to said support, means cooperating between said elements whereby when said second element is moved axially in one direction it causes axial advancement of the first mentioned element to move said fingers to pressure plate released position, and manually controllable means cooperating between said elements to urge the second mentioned element to rotate with the first mentioned element.

18. In a clutch structure, in combination, a driving member having a clutch cover, a pressure plate, fingers for moving said pressure plate, and an element cooperable with said fingers and supported centrally of said plate for equal rotation therewith and axially slidable movement with respect thereto, a support, an element on said support so constructed and arranged that rotation thereof relative to said support effects axial advancement thereof on said support, said second element being cooperable with the first mentioned element whereby axial advancement thereof in one direction effects axial advancement of the first mentioned element in the same direction, a member mounted on said second element for equal rotation therewith and axially movable with respect thereto, and manually controllable means for moving the last mentioned member into frictional engagement with the first mentioned element whereby to frictionally urge the second mentioned element toward equal rotation with the first mentioned element.

19. In a clutch structure, in combination, a driving element, a driven element, means for securing said driving element and said driven element together in driving engagement, and means for relieving said driving engagement including a stationary support, a pair of members on said support so constructed and arranged that rotational movement between them will effect axial advancement of one of them with respect to the other thereof to relieve said securing means, means for driving one of said members from said driving element relative to the other of said members, and means arranged in follow up relation with respect to said one of said members for controlling said relieving movement thereof.

20. In combination, a clutch including a driving member, a driven member and means constantly urging said members towards engaged relation with each other, a transmission housing in spaced relation with said clutch, and means interposed between said clutch and transmission housing for controlling the operation of said clutch including a support fixed to said transmission housing, operator actuated means for moving the second mentioned means in a direction to disengage said clutch solely by operator force, in the absence of rotation of said driving member, and rotatable means carried at least in part by said support responsive to rotation of said driving member for augmenting said operator force.

21. In combination, a clutch including a driving member, a driven member and means constantly urging said members towards engaged relation with each other, a transmission housing in spaced relation with said clutch, and means interposed between said clutch and transmission housing for controlling the operation of said clutch including a support fixed to said transmission housing, operator actuated means for moving the second mentioned means in a direction to disengage said clutch solely by operator force, in the absence of rotation of said driving member, a second member carried by said support so constructed and arranged as to effect axial movement thereof to augment said operator force upon rotation thereof relative to said support, and braking means controlled by said operator actuated means rotatable with said driving member for effecting rotation of said second member.

PETER F. ROSSMANN.